Nov. 11, 1969  A. D. MARTIN ET AL  3,478,139
METHOD OF EXTRUDING TUBULAR WEBBING AND CROSS-RIBBED TUBULAR FILM
Original Filed March 16, 1964  2 Sheets-Sheet 1
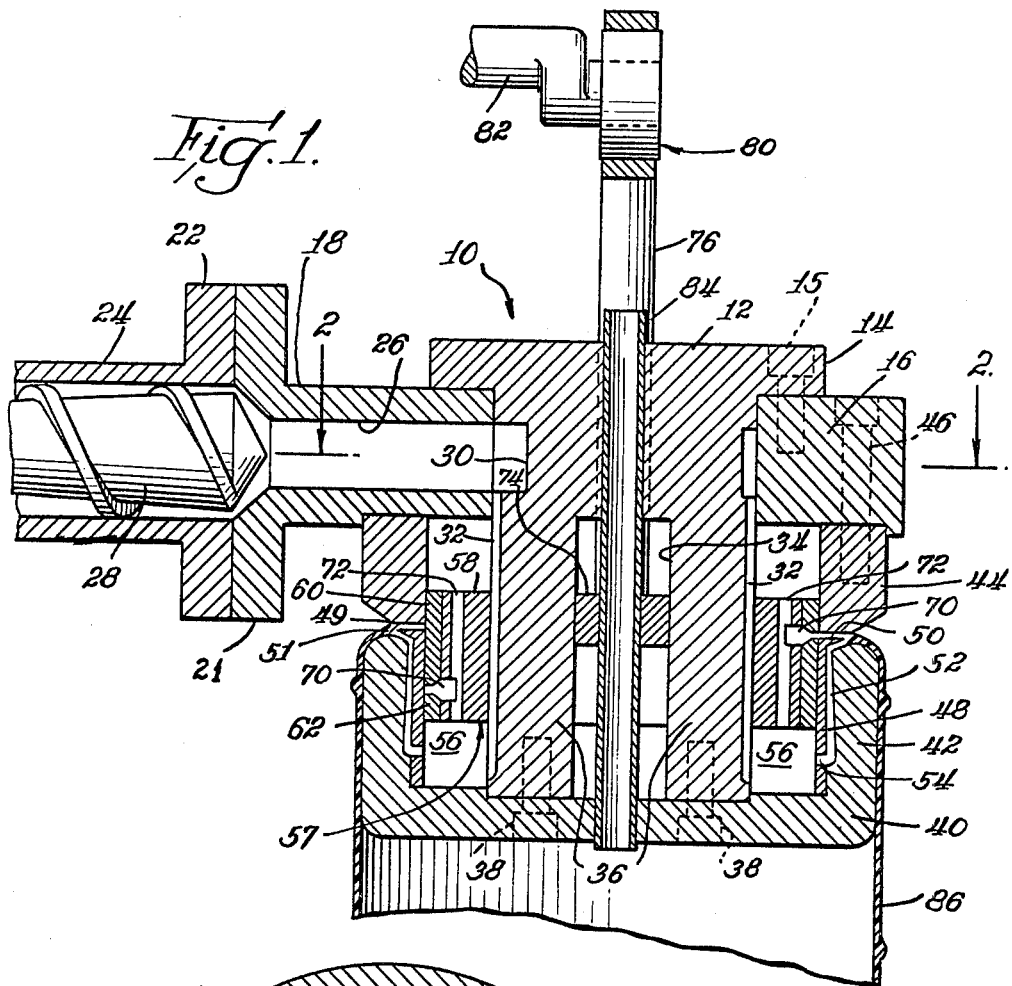
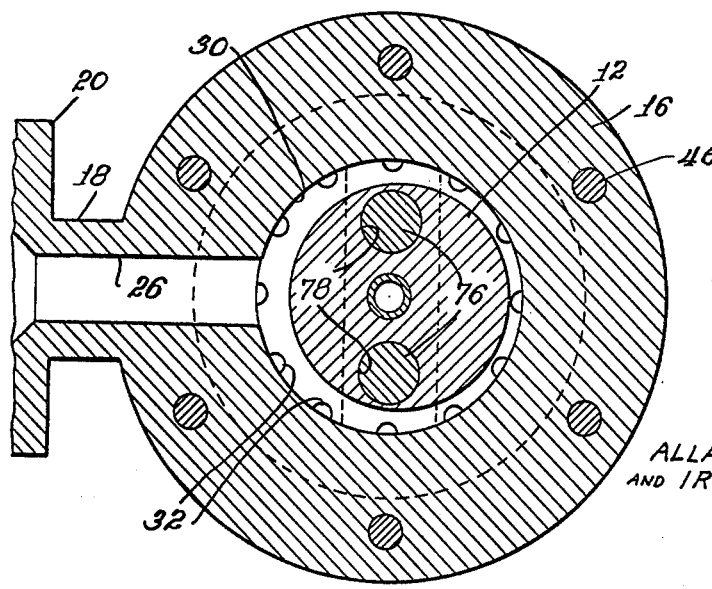
INVENTORS
ALLAN D. MARTIN
AND IRVING S. HOUVENER

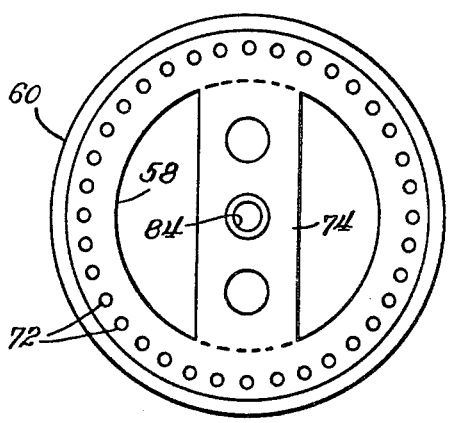
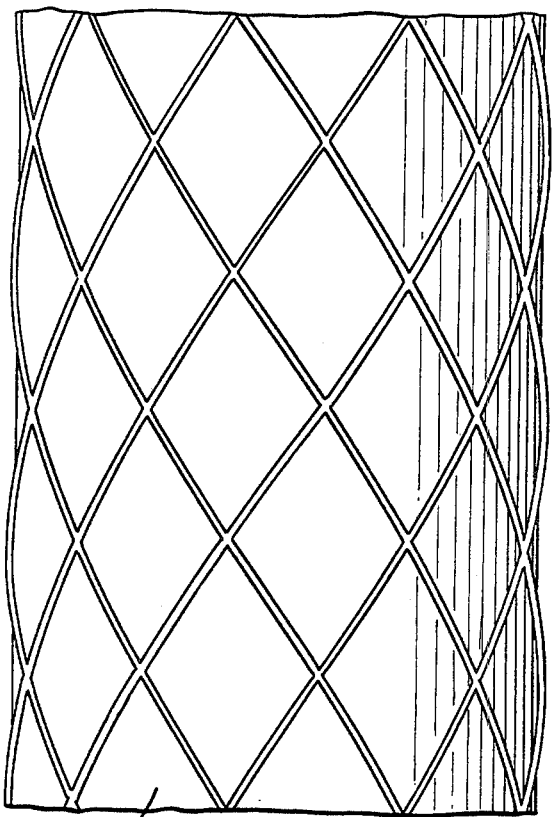
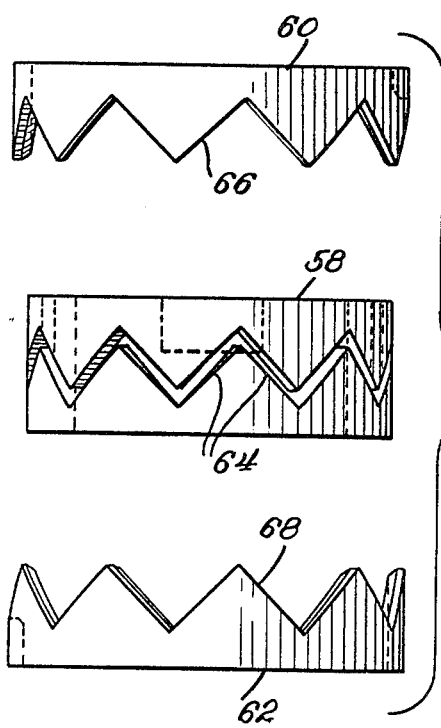

United States Patent Office 3,478,139
Patented Nov. 11, 1969

3,478,139
METHOD OF EXTRUDING TUBULAR WEBBING AND CROSS-RIBBED TUBULAR FILM
Allan D. Martin, Sanford, and Irving S. Houvener, Midland, Mich., assignors to The Dow Chemical Company, Midland, Mich., a corporation of Delaware
Original application Mar. 16, 1964, Ser. No. 353,315. Divided and this application July 27, 1967, Ser. No. 677,810
Int. Cl. B32b 31/00; B29c 17/04; B29d 23/04; D01d 5/00
U.S. Cl. 264—167                                         2 Claims

ABSTRACT OF THE DISCLOSURE

A method for extruding plastic tubular webbing and also film having a cross-ribbed surface which involves extruding ribbons of plastic, and also a sheet, if film with a cross-ribbed surface is desired, through an annular slot, and uniting said ribbons in cross-rib manner, and adhering the resultant cross-ribbed ribbons to said film.

---

This application is a division of application Ser. No. 353,315 filed Mar. 16, 1964, now Patent No. 3,358,329.

This invention relates to a method adapted for fabrication of tubular webbing, which optionally may be formed on the exterior surface of a tubular film, to further enhance the appearance and strength of the tubular film.

While any material which is extrudable may be used in practicing the invention, plastic materials such as normally solid polyolefins, particularly polyethylene, polypropylene, copolymers of ethylene and propylene and the like, polystyrene and nylon, may be most advantageously utilized.

The type of product under consideration is relatively new in the art of plastic extrusion. For example, reference may be made to U.S. Patent 2,919,467 issued Jan. 5, 1960, to F. B. Mercer, which discloses a method and apparatus for fabrication of plastic net-like structures. While the teachings of the Mercer patent and those of the present disclosure, have certain objectives in common, the method, apparatus and product disclosed herein differ significantly from that of the Mercer patent. Considering the product, that produced by the apparatus of Mercer is obtained in effect, by longitudinally splitting or shearing extruded strands of material as they move from an extrusion nozzle. Predetermined lengths of each strand are left unsplit whereby adjoining strands will be interconnected in a manner as to form a net-like structure.

In the product produced by the present invention, the strands making up the web-like structure are extruded with a uniform thickness diameter and in a predesignated manner to achieve a web-like product. Irrespective of the relative merits of the comparative products under consideration, the principles of the present invention provide greater flexibility in product, for among other things, either tubular webbing or tubular film having a webbing exterior, may be extruded in a continuous operation. The apparatus of the present invention may likewise be used to achieve a great variety of web patterns, as with the apparatus of the Mercer patent.

The main object of this invention is to provide a method for producing webbing in a continuous extrusion operation.

Another object of the invention is to provide a method for producing plastic webbing in a continuous extrusion operation wherein the pattern of the webbing may be varied.

Still another object of the invention is to provide a method for producing a plastic tubular product in either webbing form, or as a solid film having an integrally formed webbing exterior surface.

These and further objects and features of the invention will become more apparent from the following description and accompanying drawings wherein:

FIG. 1 is an elevation view in cross-section of extruder apparatus embodying the principles of the invention;

FIG. 2 is a section view generally as seen along line 2—2 in FIG. 1;

FIG. 3 is a top view of a rib forming nozzle assembly;

FIG. 4 is an exploded view of certain components forming the assembly shown in FIG. 3; and FIG. 5 is an exterior view of a tubular film with web ribbing on the exterior surface as produced by the apparatus of FIG. 1.

Referring now to the drawings and more particularly to FIGS. 1 to 4, an extruder head assembly 10 includes a body core 12, which is generally cylindrical in shape and has a flange 14 at the upper end to which is secured, by fastening means such as cap screws 15, a disc-like body 16. The latter is provided with an integral neck portion 18 having a flange 20 adapted for coupling with a flange 22 of an extruder barrel 24 of a plastic extruder (not shown). A sprue, comprising a passageway 26 formed in the body 16, is arranged for receipt of plastic material from the extruder forced into the passageway by an extruder screw 28. Passageway 26 opens into a gate, comprising a circumferential groove 30 formed on the periphery of the body core 12. The gate 30 has an eccentric configuration, as best seen in FIG. 2, whereby the groove depth tapers uniformly bi-directional to a point of minimum depth directly opposite the passageway 26. In such manner, a pressure distributing means is provided for plastic material forced into the gate 30 so that it will flow more evenly during continuous extrusion operation, as will be more apparent hereinafter.

A plurality of vertically arranged semi-circular distributing grooves 32 are formed on the periphery of the body core 12, which grooves provide for flow of plastic material downwardly from the gate 30. The body core 12 has a diametrical recess 34 extending from its lower end to a point slightly below a horizontal projection of the lower edge of the gate 30. In effect, such recess 34, serves to fashion a pair of segmental legs 36 out of a major portion of the body core 12.

Secured to the lower end of the legs 36 by fastening means, such as cap screws 38, is a lower film forming nozzle part 40, which is cup-like in form with a side wall 42 extending upwardly, as best seen in FIG. 1. An upper stationary rib forming nozzle part 44, which is cylindrical in form, is secured to the underside of the body 16 by fastening means such as cap screws 46. A lower stationary film forming nozzle part 48, in the form of a sleeve having a radially directed and tapered flange 50 at the upper end, is mounted within the nozzle part 40. The sides of the flange 50 are in spaced relation to the end of the nozzle part 44, and nozzle part 40, to provide circumferential openings, or slots, 49 and 51, respectively, as best seen in FIG. 1. A major portion of the nozzle part 48 is in spaced relation to the nozzle part wall 42, to provide a film forming gate 52. A plurality of flow control orifices 54 are formed in the nozzle part 48, whereby plastic material may be forced into the gate 52.

The inner diameter of the nozzle part 48 and the inner diameter of the nozzle part 44 are equal, and define in part a chamber 56 the confines of which are further defined by the under surface of the body 16, the peripheral surface of each leg 36, and the inner bottom surface of the nozzle part 40.

Mounted for reciprocal movement in the chamber 56 is a rib forming nozzle assembly 57 including a body part 58, upper part 60, and a lower part 62, all of which are primarily cylindrical in form. The body part 58 has a groove 64 on the peripheral surface which has a zig-zag, or saw tooth configuration. The lower edge of the part 60 has a saw tooth configuration 66 corresponding with the upper edge of the groove 64, while the upper edge of part 62 has a saw tooth configuration 68 corresponding with the lower edge of the groove 64. The parts 60 and 62 are press fit upon the body part 58, so that the edges 66, 68 and groove 64 define a gate 70, the radially outer edge of which opens unto the circumferential wall of chamber 56, while the inner edge is intersected by a plurality of vertically arranged holes 72 extending through the body part 58.

A cross bar 74 is provided in the body 58, to which is connected two rods 76 extending upwardly through holes 78 formed in the body core 12. The upper end of the rods 76 are provided with an eccentric arrangement 80, driven by a rotatable shaft 82 operated from a motor means (not shown) whereby reciprocal movement of the rods is provided. In such manner, reciprocal movement of the nozzle assembly 57 in chamber 56 is effected.

Extending through the body core 12 as well as the cross bar 74 and nozzle part 40, is a tube 84, the upper end of which is connected to a source of pressurized medium, preferably air, whereby a tube of film 76 being extruded from the assembly 10 may be blown out to desired size.

Operation of the extruder assembly should be apparent, however; briefly it is as follows. Plastic material is forced under pressure from a source into the sprue 26, from when it flows into the gate 30, and down through the grooves 32 into the chamber 56 on both upper and lower sides of the nozzle assembly 57. It then passes through the holes 72 into the gate 70. As the nozzle assembly 57 is reciprocated, the gate 70 will be moved across the circumferential opening, or slot 49, whereby plastic will flow out of the gate 70 in ribbon form, since only discrete portions of the saw tooth gate will be uncovered by the slot 49 in any given position of the nozzle assembly. In effect, the plastic material will be extruded from the slot 49 in ribbon form, which will assume a criss-cross generally diamond-shaped pattern, as illustrated in FIG. 5.

Simultaneously with extrusion of plastic from the slot 49, a tubular film of plastic material will be extruded from the slot 51, via gate 52 as fed from the chamber 56, by way of orifices 54. Since the plastic being extruded from the slots 49 and 51 will be soft, or in semi-liquid form, the web-like extrudate from slot 49, will fuse or intimately adhere to the tubular extrudate from slot 51, to form a solid tube having an exterior web-like surface, which among other things, enhances the appearance and strength of the tube. Upon emerging from the extruder head assembly 10 the tubular product may be moved through a liquid bath (not shown), or air cured, depending upon the type of material being processed, which technique is of course well known to those skilled in the art. In addition, the tubular product may be split to provide a flat sheet of webbing, if desired. However, a flat webbing may preferably be fabricated utilizing the apparatus of the copending application of Allan D. Martin, Ser. No. 141,161 filed Sept. 27, 1961.

If it is desired to extrude only a web-like tubular form, it is only necessary to remove or block the gate 52, whereby the solid tubular film portion, as normally extruded from the slot 51, will be eliminated.

It will be obvious that the pattern of the webbing extruded will depend upon various factors including the configuration of the groove 64, and the edges 66, 68 defining gate 70, as well as the velocity of extrusion and speed of reciprocating movement of the nozzle assembly 57. Possibilities in addition to the generally square, or diamond shaped pattern illustrated in FIG. 5, are circles, stars, and simple abstract shapes.

What is claimed is:

1. A method of fabricating a plastic tubular webbing comprising the steps of feeding molten plastic material into a circumferential gate, feeding to the side of a tubular body which has a repetitive irregular path, confining said material in said gate, and causing reciprocal movement between said gate and a circumferential opening on the side of a tubular nozzle immediately outside of said circumferential gate to allow a ribbon of material to pass through the opening at every intersection of the opening and the gate with a uniform dimension whereby a tubular webbing will be fabricated.

2. The method of claim 1 for fabricating a plastic tubular film having a cross-ribbed surface comprising, in addition, the simultaneous steps of forming a tube of plastic material concentric with said ribbons by direct feeding of said molten plastic to said opening whereby said tube is formed, and causing the tubular webbing to intimately adhere to the tube of plastic material as the latter is being formed whereby a tube with a cross-ribbed surface will be fabricated.

References Cited

UNITED STATES PATENTS

| | | |
|---|---|---|
| 3,070,840 | 1/1963 | Mercer. |
| 3,112,526 | 12/1963 | Martin. |
| 3,193,604 | 7/1965 | Mercer. |
| 3,178,328 | 4/1965 | Tittmann. |
| 3,247,039 | 4/1966 | Schultheiss _____ 246—167 X |

FOREIGN PATENTS

| | | |
|---|---|---|
| 1,109,131 | 6/1961 | Germany. |

ROBERT F. WHITE, Primary Examiner

K. J. HOVET, Assistant Examiner

U.S. Cl. X.R.
264—95, 173, 209